(12) United States Patent
Nigam et al.

(10) Patent No.: US 9,846,730 B2
(45) Date of Patent: Dec. 19, 2017

(54) INTERACTING WITH RESOURCES EXCHANGED USING OPEN DATA PROTOCOL

(71) Applicants: Amit Nigam, Bangalore (IN); Divya Mary, Bangalore (IN)

(72) Inventors: Amit Nigam, Bangalore (IN); Divya Mary, Bangalore (IN)

(73) Assignee: SAP SE, Walldorf (DE)

(*) Notice: Subject to any disclaimer, the term of this patent is extended or adjusted under 35 U.S.C. 154(b) by 388 days.

(21) Appl. No.: 14/496,624

(22) Filed: Sep. 25, 2014

(65) Prior Publication Data

US 2015/0142781 A1 May 21, 2015

Related U.S. Application Data

(60) Provisional application No. 61/907,037, filed on Nov. 21, 2013.

(51) Int. Cl.
*G06F 17/30* (2006.01)
*G06F 17/24* (2006.01)
(Continued)

(52) U.S. Cl.
CPC ...... *G06F 17/30557* (2013.01); *G06F 17/227* (2013.01); *G06F 17/2276* (2013.01);
(Continued)

(58) Field of Classification Search
CPC ......... G06F 17/30569; G06F 17/30339; G06F 17/3061; G06F 17/30058; G06F 17/30893;
(Continued)

(56) References Cited

U.S. PATENT DOCUMENTS 5,428,737 A * 6/1995 Li ..................... G06F 17/30398
6,301,579 B1 * 10/2001 Becker ............. G06F 17/30592
(Continued)

OTHER PUBLICATIONS

Matthew Baxter-Reynolds Multimobile development building applications for iPhone and Android, Apress, 2010, pp. 1-462.*
(Continued)

*Primary Examiner* — Srirama Channavajjala
(74) *Attorney, Agent, or Firm* — Fish & Richardson P.C.

(57) ABSTRACT

The present disclosure relates to computer-implemented methods and computer systems for providing user-friendly and understandable presentations of Open Data (OData) Protocol resources through an automatic translation and modification process. The present disclosure provides a user interface tool for presenting and browsing OData fees that can provide a visualization of an OData feed structure to users in an otherwise unavailable format. In particular, developers can view and modify resources outside of the underlying format in which such OData feeds are traditionally presented. The user interface tool can provide an out-of-box user interface with which a developer can view and modify resources associated with a feed, browse related entity sets, set filters, and perform other operations. In essence, the user interface tool can decrease user's efforts and difficult in understanding particular OData feeds and the entities associated therewith.

19 Claims, 17 Drawing Sheets

(51) Int. Cl.
*G06F 17/28* (2006.01)
*G06F 17/22* (2006.01)

(52) U.S. Cl.
CPC ........ *G06F 17/245* (2013.01); *G06F 17/2809* (2013.01); *G06F 17/30286* (2013.01); *G06F 17/30398* (2013.01); *G06F 17/30401* (2013.01); *G06F 17/30914* (2013.01)

(58) Field of Classification Search
CPC .... G06F 11/1438; G06F 11/1482; G06F 8/24; G06F 8/36; G06F 8/38; G06F 9/4428; G06F 17/30286; G06F 17/30914; G06F 17/30398; G06F 17/245; H04L 69/08
See application file for complete search history.

(56) References Cited

U.S. PATENT DOCUMENTS

| | | | | |
|---|---|---|---|---|
| 6,353,830 | B1* | 3/2002 | Yee | G06F 17/30392 |
| 6,639,611 | B1* | 10/2003 | Leduc | G06F 17/245 715/236 |
| 7,600,200 | B2* | 10/2009 | K | G05B 15/02 700/17 |
| 2004/0015783 | A1* | 1/2004 | Lennon | G06F 17/30389 715/235 |
| 2004/0128296 | A1* | 7/2004 | Krishnamurthy | G06F 17/30595 |
| 2004/0148612 | A1* | 7/2004 | Olsen | G06F 8/30 719/328 |
| 2005/0044486 | A1* | 2/2005 | Kotler | G06F 17/211 715/209 |
| 2006/0007464 | A1* | 1/2006 | Percey | G06F 17/2247 358/1.13 |
| 2006/0179068 | A1* | 8/2006 | Warner | G06F 17/30917 |
| 2008/0027788 | A1* | 1/2008 | Lawrence | G06Q 30/02 705/7.33 |
| 2010/0295856 | A1* | 11/2010 | Ferreira | G06T 11/60 345/441 |
| 2011/0038470 | A1* | 2/2011 | Kent | H04M 1/575 379/142.04 |
| 2012/0101975 | A1* | 4/2012 | Khosravy | G06Q 30/02 706/55 |
| 2012/0310990 | A1* | 12/2012 | Viegas | G06F 17/30058 707/794 |
| 2013/0282703 | A1* | 10/2013 | Puterman-Sobe | G06F 17/3061 707/723 |
| 2014/0007042 | A1* | 1/2014 | Channes | G06F 8/30 717/106 |
| 2015/0006732 | A1* | 1/2015 | Schmidt | H04L 47/726 709/226 |
| 2015/0149445 | A1* | 5/2015 | Foebel | G06F 17/30371 707/722 |

OTHER PUBLICATIONS

Actian corporation: Accessing Actian PSQL Data from a Java OData Application, 2013, pp. 1-3.*
Sarith Divakar M, "OData protocol for Infinispan",International Journal of Advanced Research in Computer and Communication Engineering,vol. 4, Issue 2, Feb. 2015.*
Chapter 11—Converting XML to Relational Data,DB2 pureXML Cookbook, Copyright 2010 by International Business Machines Corporation, pp. 297-319.*
Sesame Data Browser / ODATA Explorer <http://metasapiens.com/sesame/data-browser/preview/[10/28/2013 3:18:29 PM]>.
Sesame Data Browser / Odata Explorer < http://metasapiens.com/sesame/data-browser/[10/28/2013 3:20:21 PM]>.
Announcing the Odata Explorer; Mar. 16, 2010; <http://blogs.msdn.com/b/phaniraj/archive/2010/03/17/announcing-the-odata-explorer.aspx[10/28/2013 3:22:07 PM]>.
ODATA Browser, Xamarin; <http://xamarin.com/apps/app/odata_browser[10/28/2013 3:23:14 PM]>.
ODATA Browser; GitHub; <https://github.com/praeclarum/odata[10/28/2013 3:24:29 PM]>.

* cited by examiner

FIG. 2F

| Available Collections | | | | | | | |
|---|---|---|---|---|---|---|---|
| Name | Create | Update | Delete | Query | Filter Required | | |
| AccountA... | ✓ | ✓ | | | | | |
| Accounts... | ✓ | | | | | | |
| AccountB... | | | | | | | |
| Factsheet... | | | | | | | |
| Accounts... | ✓ | ✓ | | | | | |
| AccountR... | | | | | | | |
| AccountC... | ✓ | ✓ | | | | | |
| AccountR... | | | | | | | |
| AccountB... | | | | ✓ | | | |
| AccountC... | ✓ | ✓ | | ✓ | | | |
| AddressV... | | | | | | | |
| AddressU... | | | | | | | |

228 — General Information | Properties Info — 226

TelephoneNumber
☐ Telephone
Localized Name: Telephone Number
This property can be set during updation of the entity only
Max Length: 30
Available F4 Help: No value help present for this property

202

Available Properties in AccountCollection — 206

| Properties | Navigation Properties — 230 | | | | | | |
|---|---|---|---|---|---|---|---|
| Name | End1 | Multiplicity | End2 | Multiplicity 212 | Create | Update | Delete | F4 Help |
| AccountCateg... | Account | - | Category | 1 | | ✓ | | ✓ |
| AccountComp... | Account | - | CompanyLe... | 1 | | | | ✓ |
| AccountSaluta... | Account | - | Salutation | 1 | | | | ✓ |
| AccountCountry | Account | - | Country | 1 | | | | ✓ |
| AccountURIT... | Account | - | URIType | 1 | | | | ✓ |
| AccountMarita... | Account | - | MaritalStatus | 1 | | | | ✓ |
| AccountGender | Account | - | Gender | 1 | | | | ✓ |
| accountregion | Account | - | Region | 1 | | | | ✓ |
| AccountConta... | Account | - | ContactAllo... | 1 | | | | ✓ |
| AccountNatio... | Account | - | NationalityC... | 1 | | | | ✓ |
| AccountAcad... | Account | - | AcademicTitle | 1 | | | | ✓ |
| AccountAttac... | Account | 1 | AttachmentD... | - | | | | |

Explore AccountCollection

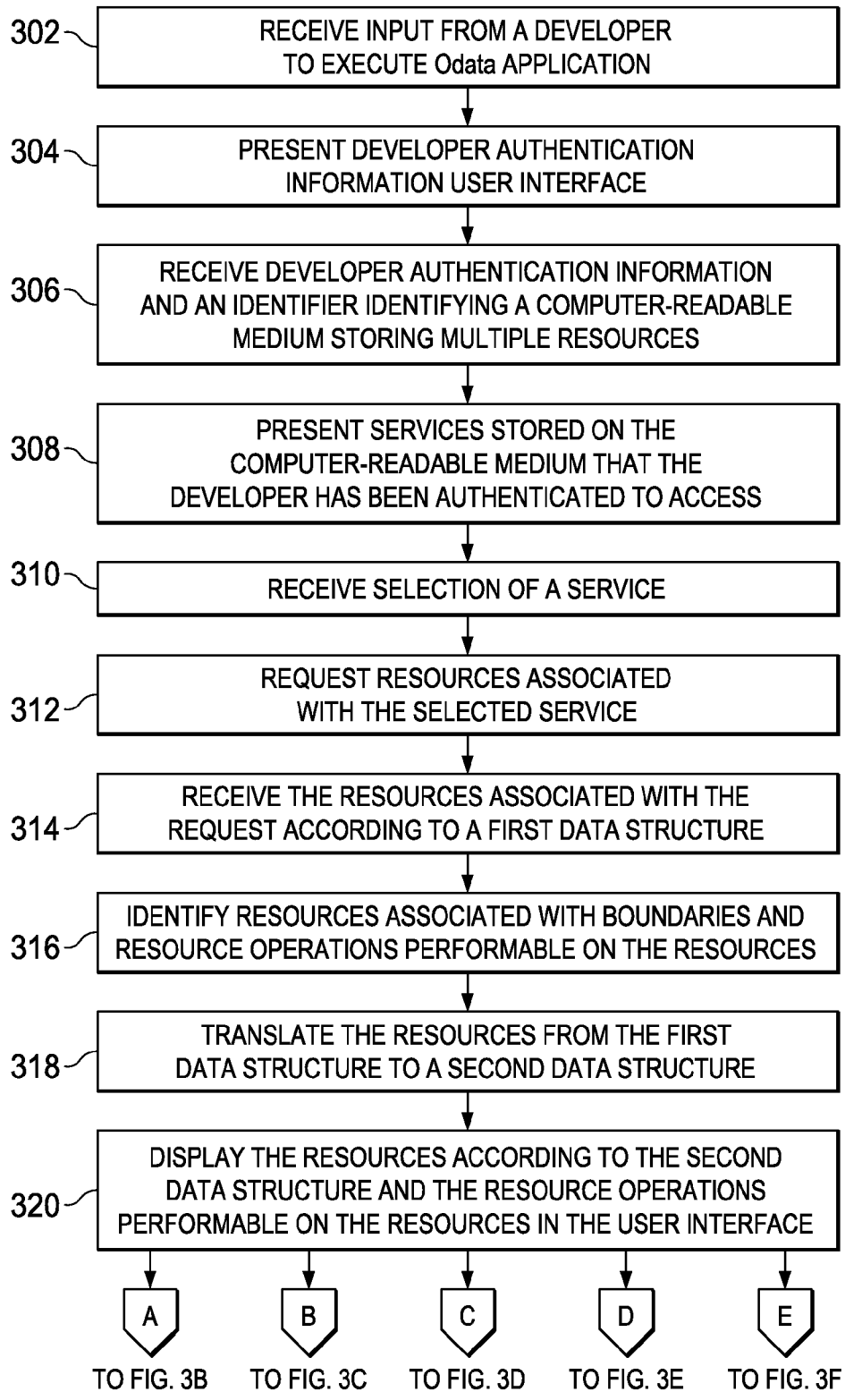

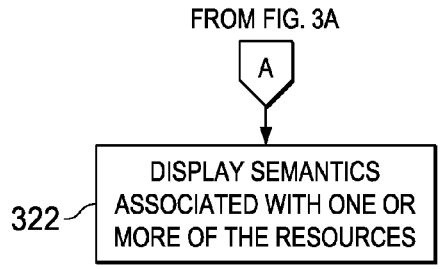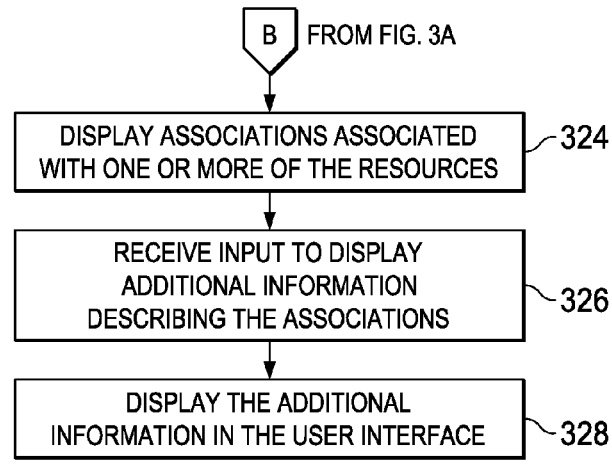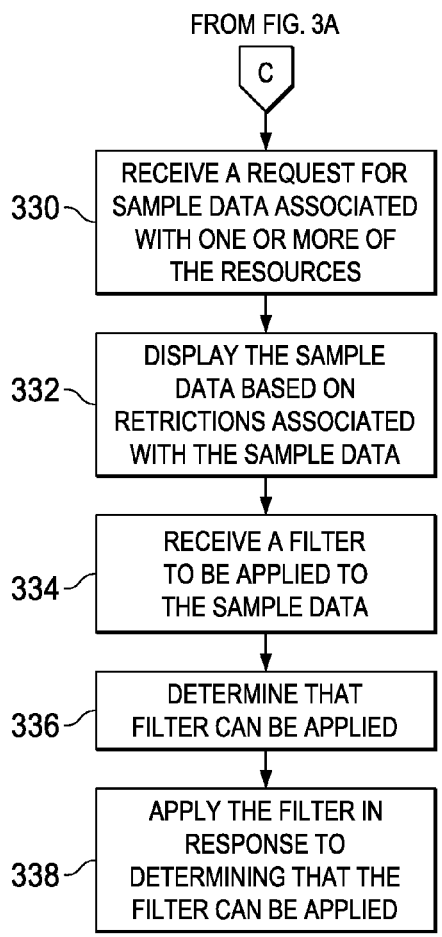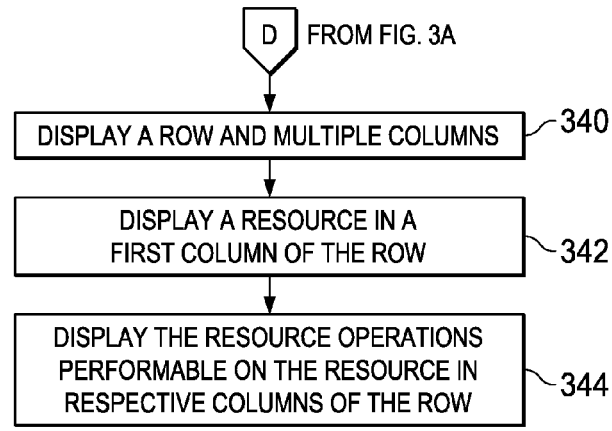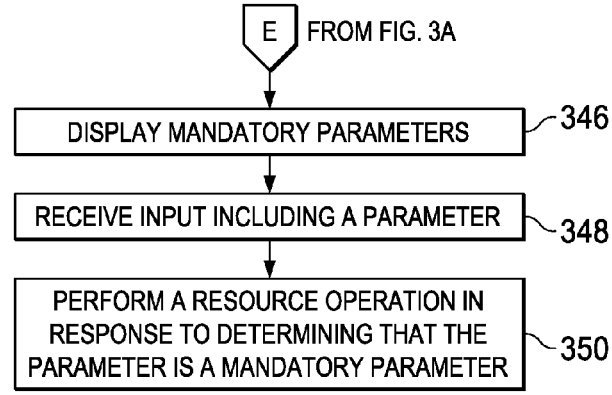

INTERACTING WITH RESOURCES EXCHANGED USING OPEN DATA PROTOCOL

CLAIM OF PRIORITY

This application claims priority under 35 USC §119(e)(1) to U.S. Provisional Application Ser. No. 61/907,037, filed on Nov. 21, 2013, the entire contents of which are hereby incorporated by reference.

TECHNICAL FIELD

The present disclosure relates to software, computer systems, and computer-implemented methods for visualizing data exchanged using the Open Data Protocol (OData).

BACKGROUND

Open Data Protocol (OData) is a standardized protocol for creating and consuming data application programming interfaces (APIs). OData can be implemented as a protocol that can expose full-featured data APIs using core protocols like Hypertext Transfer Protocol (HTTP) and Representational State Transfer (REST) architecture. OData also implements the Atom Publishing Protocol (AtomPub) for creating and updating resources, e.g., resources available over networks such as the Internet, and JavaScript Object Notation (JSON), a text-based open standard designed for human-readable data interchange. OData can be implemented to expose and access information from a variety of sources, e.g., relational databases, file systems, content management systems, resources provided on websites, and other sources. A response for an OData request can include metadata associated with the data source presented, e.g., an Extensible Markup Language (XML) document. Sometimes, parsing the structure and arrangement of data in the XML document can be difficult.

SUMMARY

This disclosure describes computer-implemented methods, computer-readable media and computer systems for interacting with data exchanged using OData.

In general, one innovative aspect of the subject matter described here can be implemented as a method performed by data processing apparatus. At a client computer system, multiple resources are received. The resources are defined according to a first data structure. The resources are received from a server computer system to a data network in response to an Open Data Protocol (OData) request for the multiple resources. A resource of the multiple resources is associated with a boundary that specifies resource operations performable on the resource. From the multiple resources, the resource associated with the boundary and the resource operations that are performable on the resource are identified. The identified resource is translated from the first data structure to a second data structure different from the first data structure. In the second data structure, the identified resource is editable to perform the resource operations on the identified resource. In a user interface, the identified resource is displayed according to the second data structure. The resource operations that are performable on the identified resource are also displayed.

This, and other aspects, can include one or more of the following features. Each of the multiple resources is a network-accessible data object or service identified by a respective identifier. Each of the multiple resources is associated with respective metadata which is received with the multiple resources. The resource operations performable on the resource can include at least one of a create operation, a retrieve operation, and update operation, or delete operation. Displaying the identified resource and the resource operations can include displaying, in the user interface, a table including a crow and multiple columns. The identified resource can be displayed in a first column of the row. The resource operations performable on the resource can be displayed in respective columns of the row. The multiple resources can be associated multiple properties. The multiple properties are filterable by multiple filters. The multiple filters by which the multiple properties are filterable can be identified. The multiple filters can be displayed in the user interface. Input to filter the multiple properties by a specified filter can be received. It can be determined whether the specified filter is included in the multiple filters. The multiple properties can be filtered by the specified filter in response to determining that the specified filter is included in the multiple filters. The boundary can represent mandatory parameters that must be provided when performing the resource operations on the identified resource. The mandatory parameters can be displayed in the user interface. Input to perform resource operations on the identified resource can be received. The input can include a parameter. The resource operations based on the parameter can be performed in response to determining that the parameter included in the input is one of the mandatory parameters that must be provided when performing the resource operations on the identified resource. A notification that the received parameter is not one of the mandatory parameters can be displayed in the user interface in response to determining that the parameter included in the input is not one of the mandatory parameters that must be provided when performing the resource operations on the identified resource. The identified resource can be a first resource. An association defining a relationship between the first resource and a second resource can be identified in response to the OData request for the multiple resources. The relationship can define a referential constraint that relates the first resource to the second resource. The identified relationship can be displayed in the user interface. Receiving the multiple resources defined according to the first data structure can include displaying, in the user interface, multiple services. Each service can be associated with a respective multiple resources. The multiple services can include a specified resource associated with the received multiple resources. A selection of the specified resource can be received in the user interface. Displaying the multiple services in the user interface can include receiving, in the user interface, authentication information that authenticates a request or off the multiple resources and an identifier identifying a computer-readable medium storing the multiple resources. It can be determined that the requester is authorized to access resources stored on the computer-readable medium based on the authentication information.

Another innovative aspect of the subject matter described here can be implemented as a computer-readable medium storing instructions executable by data processing apparatus to perform operations described here. A further innovative aspect of the subject matter described here can be implemented as a system that includes data processing apparatus and a computer-readable medium storing instructions executable by the data processing apparatus to perform the operations described here.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

BRIEF DESCRIPTION OF THE DRAWINGS

FIGS. 3A-3F are flowcharts of an example process for presenting resources obtained by implementing OData.

Like reference numbers and designations in the various drawings indicate like elements.

DETAILED DESCRIPTION

Figure 1:
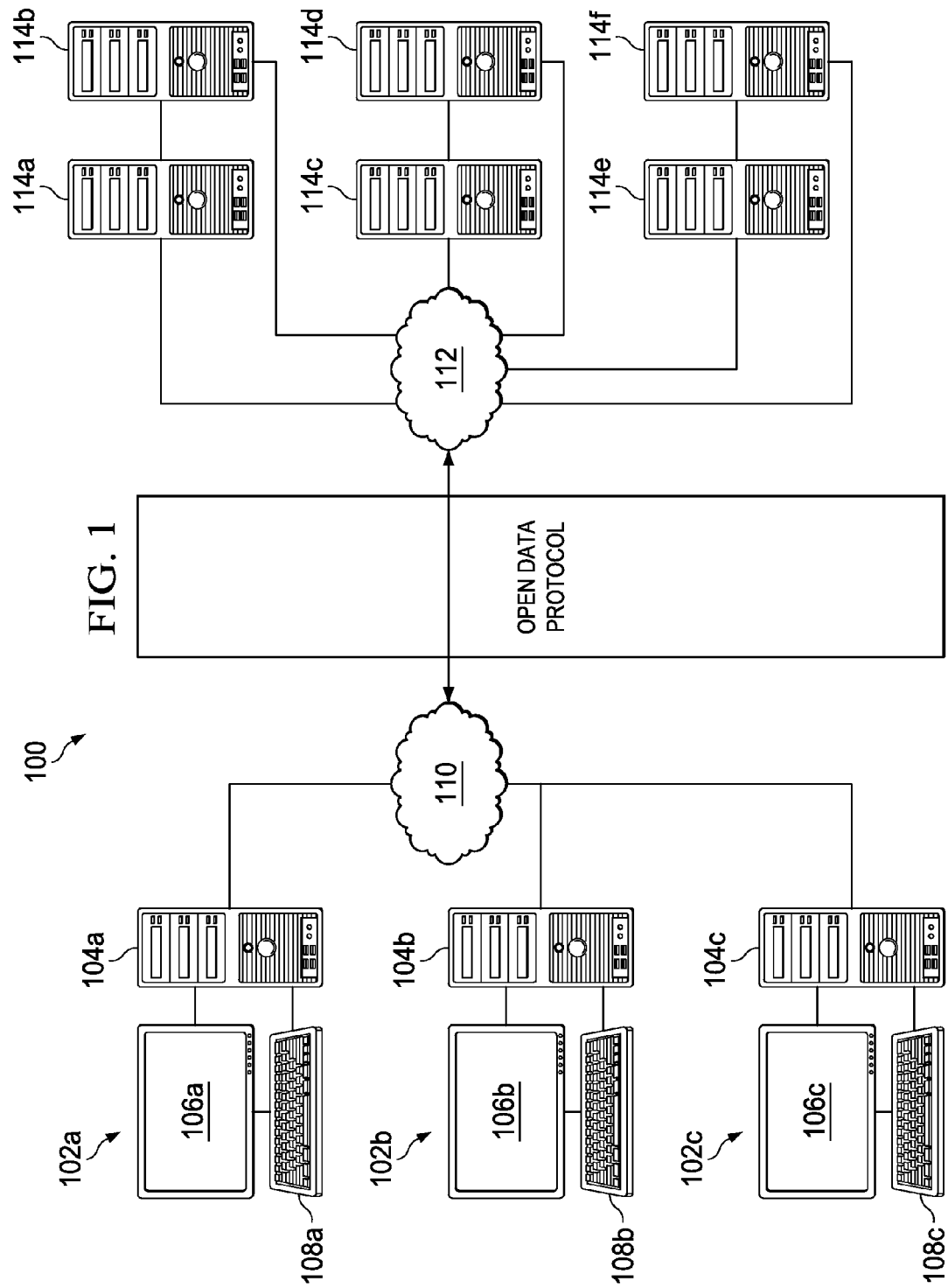
FIG. 1 is a schematic diagram showing an example client-server network exchanging resources by implementing the Open Data Protocol (OData).

This disclosure relates to interacting with resources exchanged using OData (OData feeds). OData is a standardization protocol implemented to exchange resources over a data network, e.g., the Internet. The data network includes server computer systems that host the resources and client computer systems that can interact with the server computer systems to manipulate or update the resources. An end point on a server computer system is called a service. OData is a HTTP-based protocol designed with a REST architecture. To query the resources using OData, a Uniform Resource Indicator (URI) is formed. The URI includes appropriate headers, e.g., HTTP headers such as GET, PATCH, POST, DELETE, and other headers. The resources are sent from and to the server computer systems in notations such as ATOM or JSON. Because the protocol is HTTP-based, one or more of several programming languages with an HTTP stack can be used to interact with the resources. Many client side libraries, e.g., .NET, iOS, JavaScript, Java, Ruby, Android, and other client side libraries, have been created which parse the ATOM or JSON payloads into objects to simplify interaction with the resources. Similarly, many server side libraries, e.g., .NET, Java, Azure, MySQL, PHP, Files, SQL Server, and other server side libraries, have been created to parse/generate payloads and to provide easy interaction with back ends, e.g., databases, files and other back ends, in which the resources are stored. Because OData is HTTP based, the server and client sides can be implemented using different libraries. For example, the server can expose the resources via OData can be consumed by client side library subject, in some cases, to authentication for data access.

As stated above, an end point on a server computer system that hosts resources is called a service. OData feeds can sometimes be received as Atom Service Documents from the root of a service. Such documents include titles and URIs for each of the service's feeds. As such, the service document may not include information about the shape of the entries exposed by the feed or about relationships between feeds. OData feeds often include metadata in a particular data structure, e.g., a .EDMX file which is an XML file that defines a conceptual model. The metadata includes a description of the resources, resource types, properties, relationships exposed by the service, and other description. Client computer systems that implement OData client libraries can leverage the metadata to drive the generation of client-side classes to represent server types and aid programmability. In some instances, the XML file which includes the metadata, when displayed in a user interface, can include too complicated to understand the structure of the resources and to manually bind the resource elements to the user interface. Doing so can involve significant effort on the part of a user of a client computer system (e.g., a developer of a computer software application), be error prone leading, and result in duplication of efforts.

This disclosure describes a user interface tool to present and browse OData feeds that can be implemented on a computer system, e.g., a client computer system, as a computer software application. For example, the user interface tool can be implemented as a plug-in to another computer software application executable on the computer system. Presenting the OData feed in a user interface provided by executing the user interface tool can allow a user (e.g., the developer) to visualize the OData feed structure and understand the semantics of the resources included in the OData feed. The user interface tool can be implemented to provide an out-of-box user interface using which a developer can view and modify resources. Using the user interface, the developer can browse into related entity sets (e.g., associations), set filters on properties, and perform other operations. The user interface tool can be implemented to create, update, and analyze the resources that are local to the client computer system. Using the user interface, the developer can also be informed about the availability of the possible list of values for the service properties that can be used while creating or updating the resources through the OData feeds. The user interface tool can decrease the developer's effort to understand the OData structure and its associated entities. In this manner, the user interface tool can be implemented to enhance the developer's user experience and ability to interact with resources presented to the user as OData feeds.

FIG. 1 is a schematic diagram showing an example client-server network 100 exchanging resources by implementing OData protocol. The client-server network 100 includes multiple client computer systems on the client side (e.g., a first client computer system 102a, a second client computer system 102b, a third client computer system 102c, and other client computer systems). A client computer system can include a data processing apparatus connected to input devices and output devices. For example, a first processor 104a of the first client computer system 102a can be connected to a first input device 108a and a first output device 106a. Similarly, a second processor 104b and a third processor 104c of the second client computer system 102b and the third client computer system 102c, respectively, can be connected to a second input device 108b and a third input device 108c, respectively, and a second output device 106b and a third output device 106c, respectively.

A client computer system can be, e.g., a desktop computer, a laptop computer, a tablet computer, a smart phone, a personal digital assistant (PDA) or other client computer system. Input devices can include a keyboard, a mouse, a stylus, a touchscreen, an audio input, or other input devices. Output devices can include a monitor, a touchscreen, printing systems, audio systems or other output devices. A client computer system can include a computer-readable medium (not shown) that can store computer instructions executable by the data processing apparatus to perform operations. For example, the computer instructions can be implemented by the data processing apparatus as one or more computer software applications such as client-side libraries described above. In some implementations, a developer of a computer software application can interact with OData feeds, i.e., resources exchanged over the network 100 by implementing the OData protocol, by executing one or more client-side libraries on a client computer system.

The client-server network 100 includes multiple server computer systems on the server side (e.g., server computer systems 114a, 114b, 114c, 114d, 114e, 114f, and other server computer systems) connected to the client computer systems over one or more networks (e.g., a first network 110, a second network 112, or other networks) such as the Internet. Each server computer system can store resources to be exchanged with the client computer systems by implementing the OData protocol. In addition, each server computer system can include a computer-readable medium to store computer instructions executable by data processing apparatus to perform operations. For example, each server computer system can implement one or more server-side libraries such as those discussed above to receive requests for resources from one or more client computer systems and to provide the resources in response to receiving the requests.

Figure 2A:
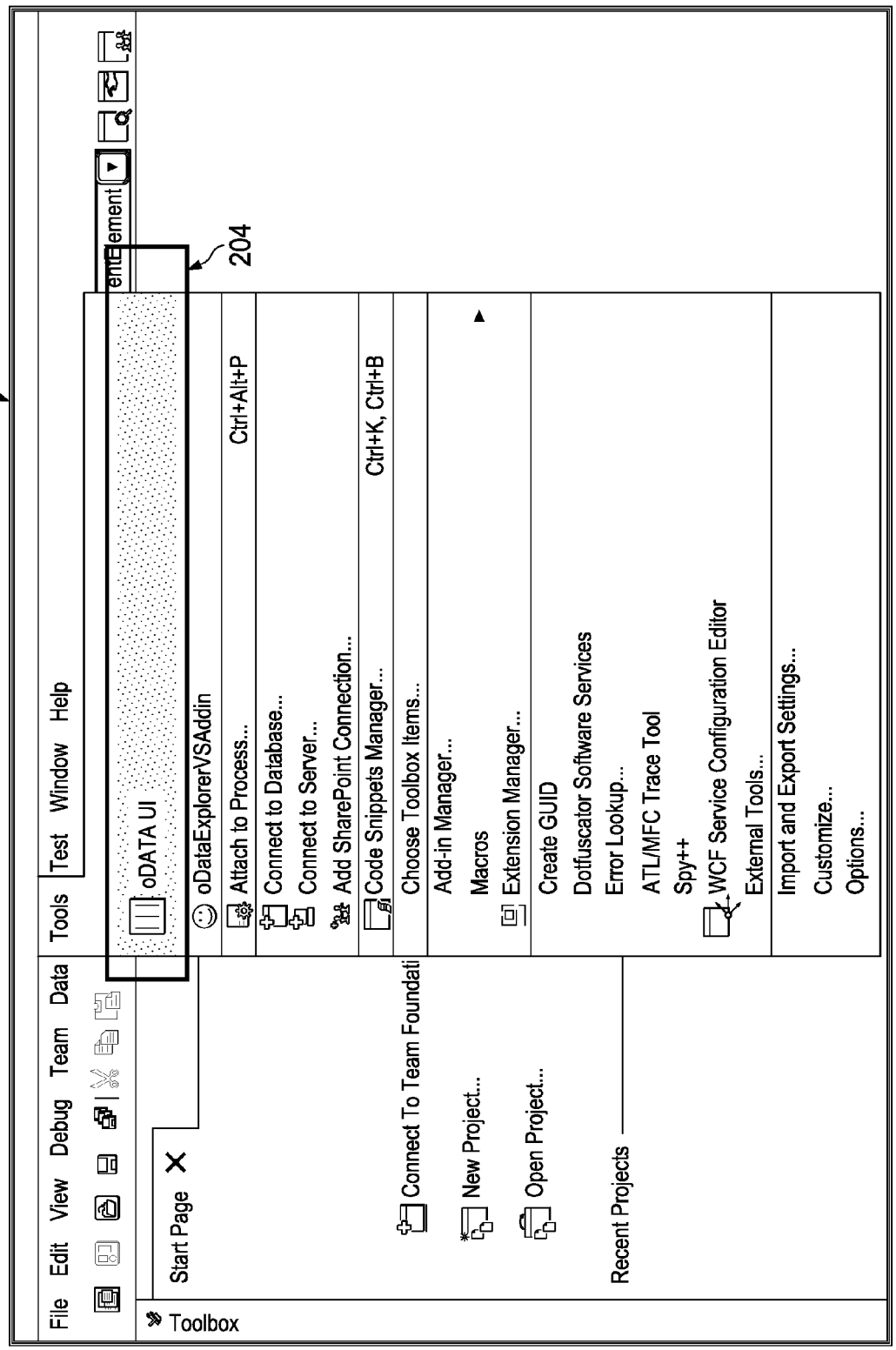
FIGS. 2A-2N are schematic diagrams of example user interfaces that present resources obtained by implementing OData.

In some implementations, a user of a client computer system (e.g., the first client computer system 102a) can be a developer of a computer software application. Using the first client computer system 102a, the developer can request resources stored on a server computer system (e.g., the first server computer system 114a). Operations implemented by the first client computer system 102a, the first server computer system 114a, and the client-server network 100 implementing the OData protocol are described below with reference to FIGS. 2A-2N, which are schematic diagrams of example user interfaces that present resources obtained by implementing OData and 3A-3F, which are flowcharts of an example process 300 for presenting resources obtained by implementing OData. The process 300 can be implemented as a computer software application stored on a computer-readable medium as computer instructions and executable by data processing apparatus included in a client computer system. In some implementations, the first client computer system 102a can implement the process 300 as an OData application plug-in to another computer software application executing on the first client computer system 102a. For example, the computer software application executing on the first client computer system 102a can be an application that a developer can use to design/develop computer software applications.

At 302, input can be received from a developer to execute the OData application. For example, the first client computer system 102a can display a user interface 202 (FIG. 2A) in the first output device 106a by executing the applications design/development software. The user interface 202 can include a selectable object 204 that can identify the OData application executable by the first client computer system 102a. Using an input device 108a, the developer can select the selectable object 204, which can represent the input to execute the OData application.

Figure 2B:
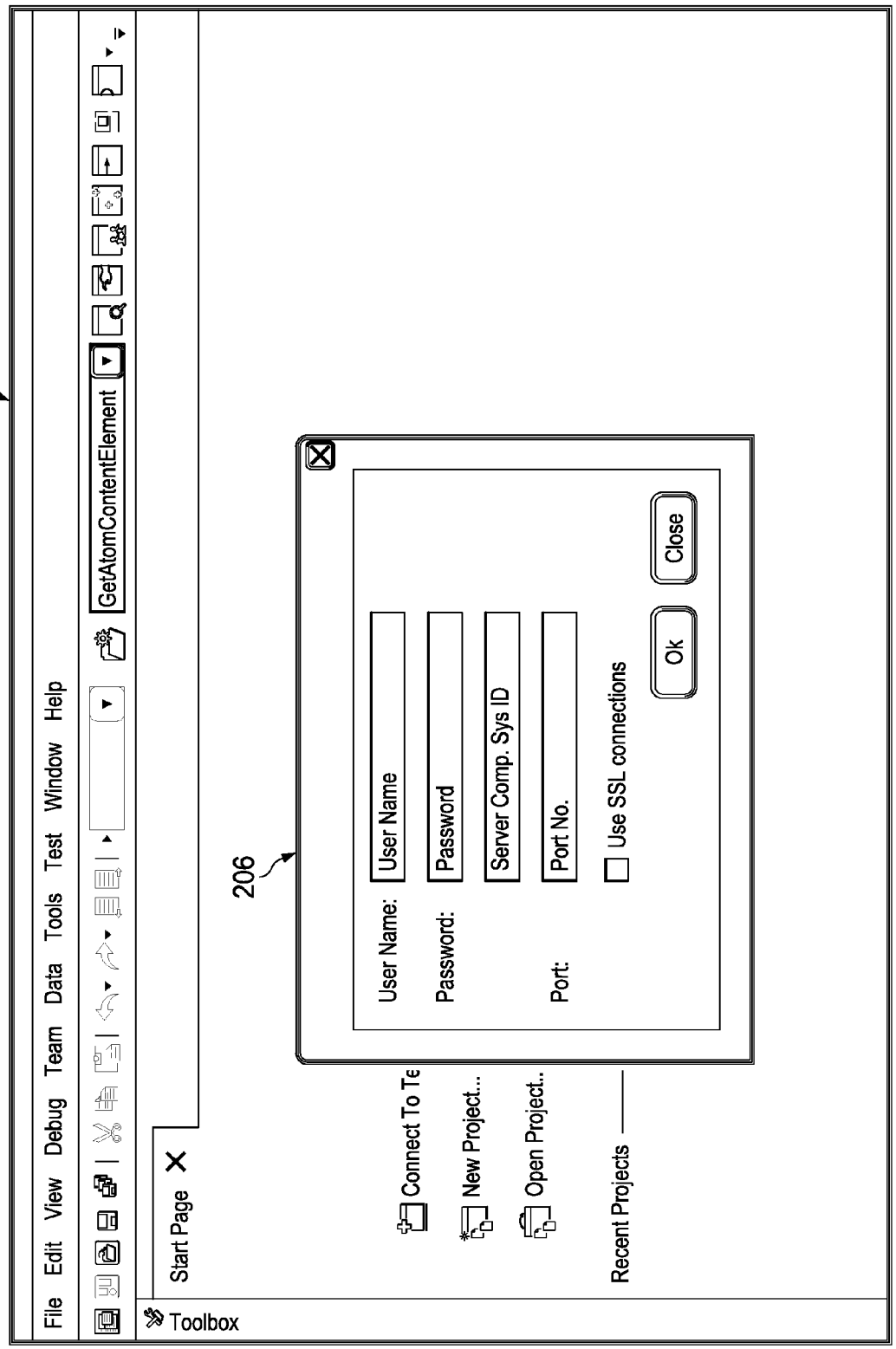

At 304, a developer authentication information can be presented to the developer. For example, in response to receiving a selection of the selectable object 204, the first client computer system 102a can display user interface 206 (FIG. 2B) requesting the developer's authentication information (e.g., log-in, password, or other authentication information). In some implementations, the first client computer system 102a can additionally request one or more identifiers identifying the server computer system that the developer is attempting to access. The server computer system can include a computer-readable medium storing resources that the developer can use to develop a computer software application. For example, the first client computer system 102a can display objects into which the developer can input an Internet Protocol (IP) address of the server computer system, a port or other identifier that identifies the server computer system.

At 306, the first client computer system 102a can receive the developer authentication information and the identifier identifying the server computer system, e.g., that the developer provides through the user interface 206. The input represents the developer's request to access services stored on the server computer system identified by the identifier. The first client computer system 102a can identify the server computer system (e.g., the first server computer system 114a), and transmit the request for the services to the first server computer system 114a. The first server computer system 114a can store multiple services, each being associated with multiple resources. The developer's authentication information can permit the developer to access one or more or all of the services stored on the first server computer system 114a. The first server computer system 114a can identify the services that the developer is permitted to access, and transmit identifiers referencing the permissible services to the first client computer system 102a.

Figure 2C:
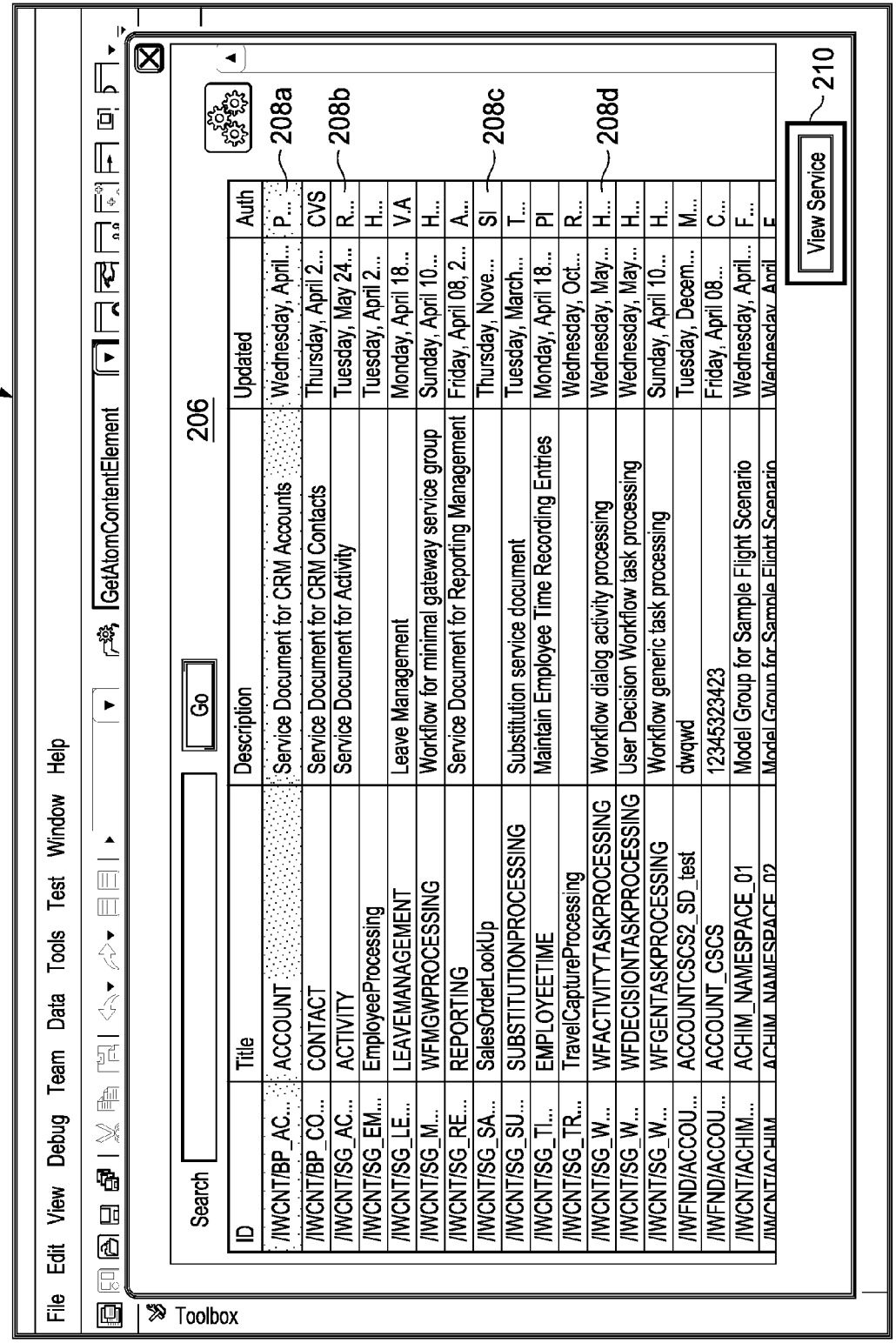

At 308, the services received from the server computer system can be presented. For example, the first client computer system 102a can receive the identifiers referencing the services transmitted by the first server computer system 114a, and display the identifiers (e.g., a first identifier 208a, a second identifier 208b, a third identifier 208c, a fourth identifier 208d, and other identifiers) in the user interface 206 (FIG. 2C). At 310, a selection of a service can be received. For example, the developer can select an identifier referencing a service (e.g., the first identifier 208a) in the user interface 206. The developer can then select a selectable object 210. At 312, resources associated with the selected service can be requested. For example, in response to the developer selecting the first identifier 208a and the selectable object 210, the first client computer system 102a can transmit the selected identifier to the first server computer system 114a. The first server computer system 114a can receive the selection and identify the associated resources.

At 314, the resources associated with the request are received according to a first data structure. For example, the first client computer system 102a receives multiple resources that are associated with the selected service. The resources can include, e.g., network-accessible data object identified by a respective identifier (e.g., URI). Each of the multiple resources is also associated with respective metadata which is received by the first client computer system 102a with the multiple resources. In some implementations, the first data structure in which the multiple resources are received is an XML structure. For example, the resources and the associated metadata and semantics can be received as a .EDMX document. The user interface tool described here can translate the .EDMX document into a second structure that can present the resources and the metadata textual and visual manner that is easier for the developer to view relative to the XML structure.

At 316, resources that are associated with boundaries and resource operations performable on the resources are identified. Each of the multiple resources is also associated with a respective boundary that specifies resource operations performable on the resource. The resource operations can include one or more of a create operation, a retrieve operation, an update operation, or a delete operation. In some implementations, one or more or all of the resources received in response to the request can be associated with respective boundaries that specify respective operations performable on the resource. A boundary defines the capabilities of the resources in the OData feed. For example, a boundary for a resource defines that the resource can be annotated as creatable or updatable (i.e., the resources cannot be created by the developer but can be updated). The respective operations can be associated with the resources as resource metadata or resource semantics (or both) The first client computer system 102a can decipher the semantics associated with the resources, and render the user interface accordingly thereby allowing the developer know that certain resources exposed through the OData feed can/cannot be created. The first client computer system 102a can identify the resources associated with the boundaries and the respective resource operations.

At 318, the resources can be translated from the first data structure into the second data structure. In some implementations, the first client computer system 102a can translate one or more or all of the received resources from the first data structure to the second data structure. In the second data structure, the resources are editable to perform the resource operations specified by the boundaries for the resources. The first client computer system 102a (e.g., the user interface tool executing on the first client computer system 102a) can translate the multiple resources from the XML structure to a tabular structure shown, for example, in FIG. 2D.

Figure 2D:
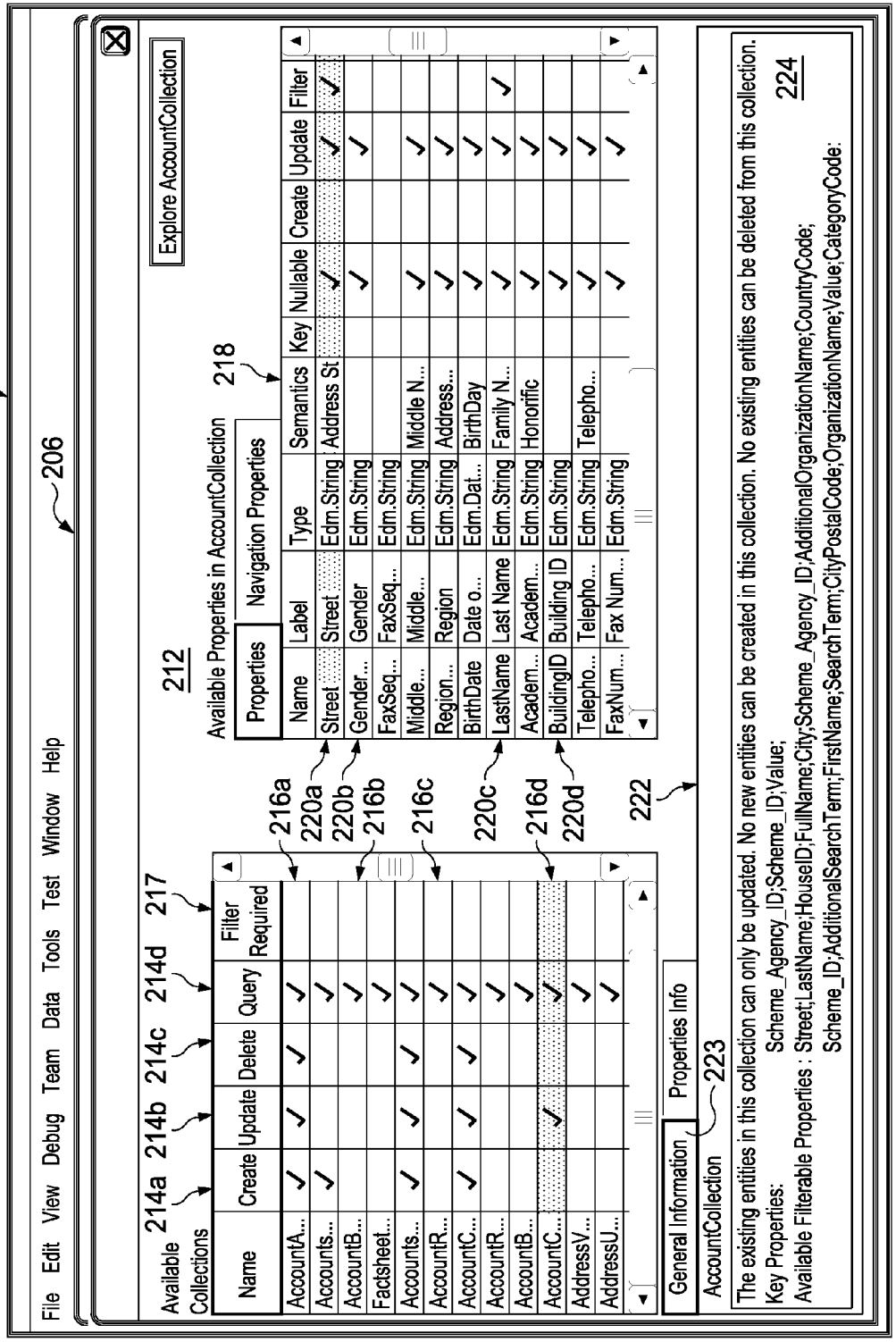

At 320, the resources can be displayed according to the second data structure and the resource operations performable on the identified resource. For example, the first client computer system 102a can display each resource in a table including multiple rows and tables (FIG. 2D). Each row in the table can represent a respective resource (e.g., a first resource 216a, a second resource 216b, a third resource 216c, a fourth resource 216d). At 340 (FIG. 3E), the first client computer system 102a can display multiple rows and columns. At 342 (FIG. 3E), the first client computer system 102a can display an identifier (e.g., a name or a URI or other identifier) referencing the resource in a first column of a row. At 344 (FIG. 3E), the first client computer system 102a can display operations formable on the resource (e.g., a create operation 214a, an update operation 214b, a delete operation 214c, a query operation 214d) in other respective columns in the row. As shown in FIG. 2D, the resource operations performable on the different resources can be different. For example, the resource operations performable on the first resource 216a can include all of the create operation 214a, the update operation 214b, the delete operation 214c, and the delete operation 214d. In contrast, the resource operations performable on the second resource 216b can include only the query operation 214d. As shown in FIG. 2D, the first client computer system 102a can display a notification (e.g., a check mark or other notification) in one or more columns in a row to identify, to the developer, the resource operations that are performable on a resource identified in the row.

One or more or all of the resources displayed in the user interface 206 can include properties, which the first client computer system 102a can display in a user interface portion 218 of the user interface 212. The properties for a resource can include, e.g., one or more of a "Name" (e.g., "Street" 220a, "GenderCode" 220b, "FaxSequenceNumber," "MiddleName," "RegionCode," "BirthDate," "LastName" 220c, "BuildingID" 220d), a "Label" (e.g., a description of "Name"), a "Type" (e.g., a string, a number, a date/time), and additional semantics. The semantics can be leveraged by the developer to render the resources according to the boundaries defined, e.g., by a resource administrator for the resources.

In some implementations, the properties with which the resources are associated can be filtered by multiple filters. The first server computer system 114a can associate multiple filters with the resources. Sometimes, a developer can filter the resources by all of the multiple filters. Sometimes, semantics associated with the resources can specify that the multiple resources can be filtered by less than all of the multiple filters. The first client computer system 102a can identify the filters by which the resources can be filtered based on the semantics, and display the filters in the user interface portion 224 (FIG. 2D). In some implementations, the first client computer system 102a can display only those properties for filtering which have been appropriately marked as being filterable, e.g., by the service developer.

The first client computer system 102a can display properties associated with the resources, e.g., restrictions on resource operations that can be performed on the resources, in a user interface portion 224 of the user interface portion 223 (FIG. 2D). Such properties can be received with the resources, e.g., as metadata or semantics (or both), from the first server computer system 114a. Semantics information can also include, e.g., value help available for a particular property of a resource. For example, a value help of a country property can be a persisted code, e.g., 2-digit country code). The first client computer system 102a can identify the properties, translate the information into a format that can be visualized more easily than an XML format, and present the translated information in the user interface portion 224. For example, the first client computer system 102a can translate the 2-digit country code into a textual property value, such as the corresponding country name, and display the country name, instead of the country code, in the user interface. Other examples of translating value help numerical values into textual values include translations of GenderCode to male/female, marital code to single/married/divorced, to name a few.

In some implementations, such properties can also be annotated through semantic information in the OData feed. The first client computer system 102a can understand the annotations and inform the developer about the availability of the value help for a property, and, in the auto-generated create/update form, provide visualization to the value help fields. Doing so can allow the developer to understand the available value help and the corresponding structure, e.g., CountryCode/name for country, RegionCode/name for region, and other structures.

Figure 2E:
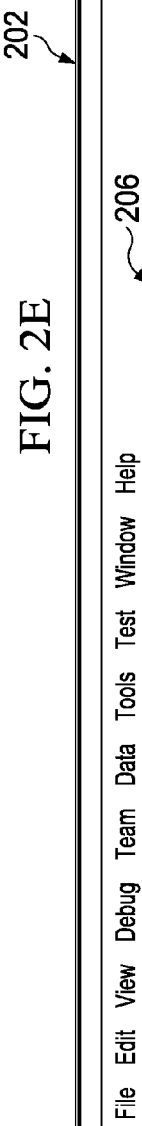

As shown in FIG. 3B, at 322, the first client computer system 102a can display the semantics associated with the resources in the user interface portions 226, 228, 230 or combinations of them (FIG. 2E). The first client computer system 102a can identify an association defining a relationship between two resources (e.g., a first resource and a second resource) in response to the OData request for the multiple resources. The relationship can define a referential constraint that relates the first resource to the second resource. The first client computer system 102a can display the identified relationship in the user interface portions 223 or 226 or both (FIG. 2F). For example, as shown in FIG. 3C, at 324, the first client computer system 102a can display associations associated with one or more of the resources. At 326, the first client computer system 102a can receive input (e.g., a selection in the user interface) to display additional information describing the associations. At 328, the first client computer system 102*a* can display the additional information in the user interface.

Figure 2G:
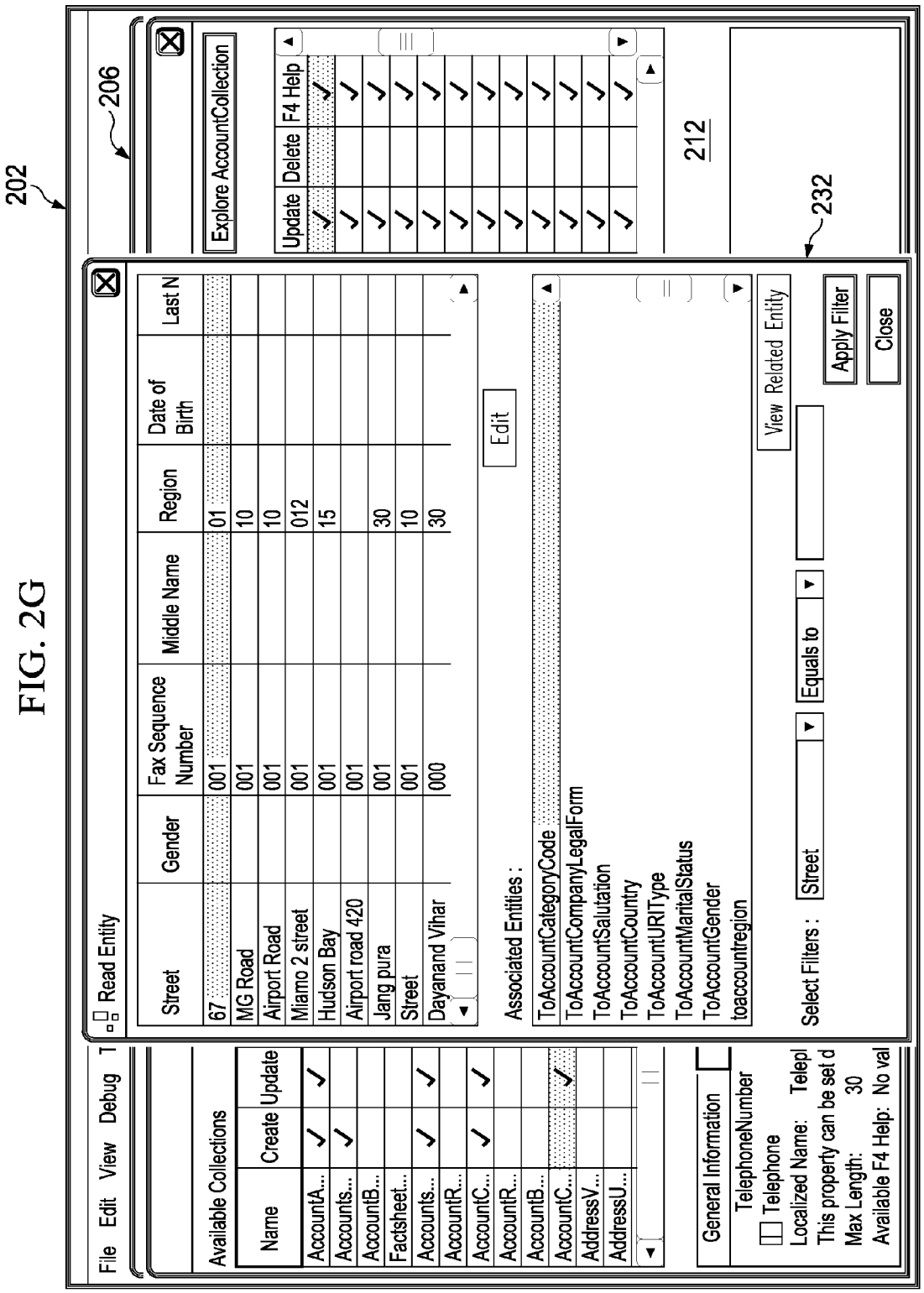

As shown in FIG. 3D, at 330, the first client computer system 102*a* can receive a request for sample data associated with one or more of the resources. At 332, the first client computer system 102*a* can display the sample data based on restrictions associated with the sample data, e.g., in user interface 232 (FIG. 2G). In some implementations, the developer can select one or more of the resources shown in the user interface 232 from the OData feed to understand the data.

Figure 2H:
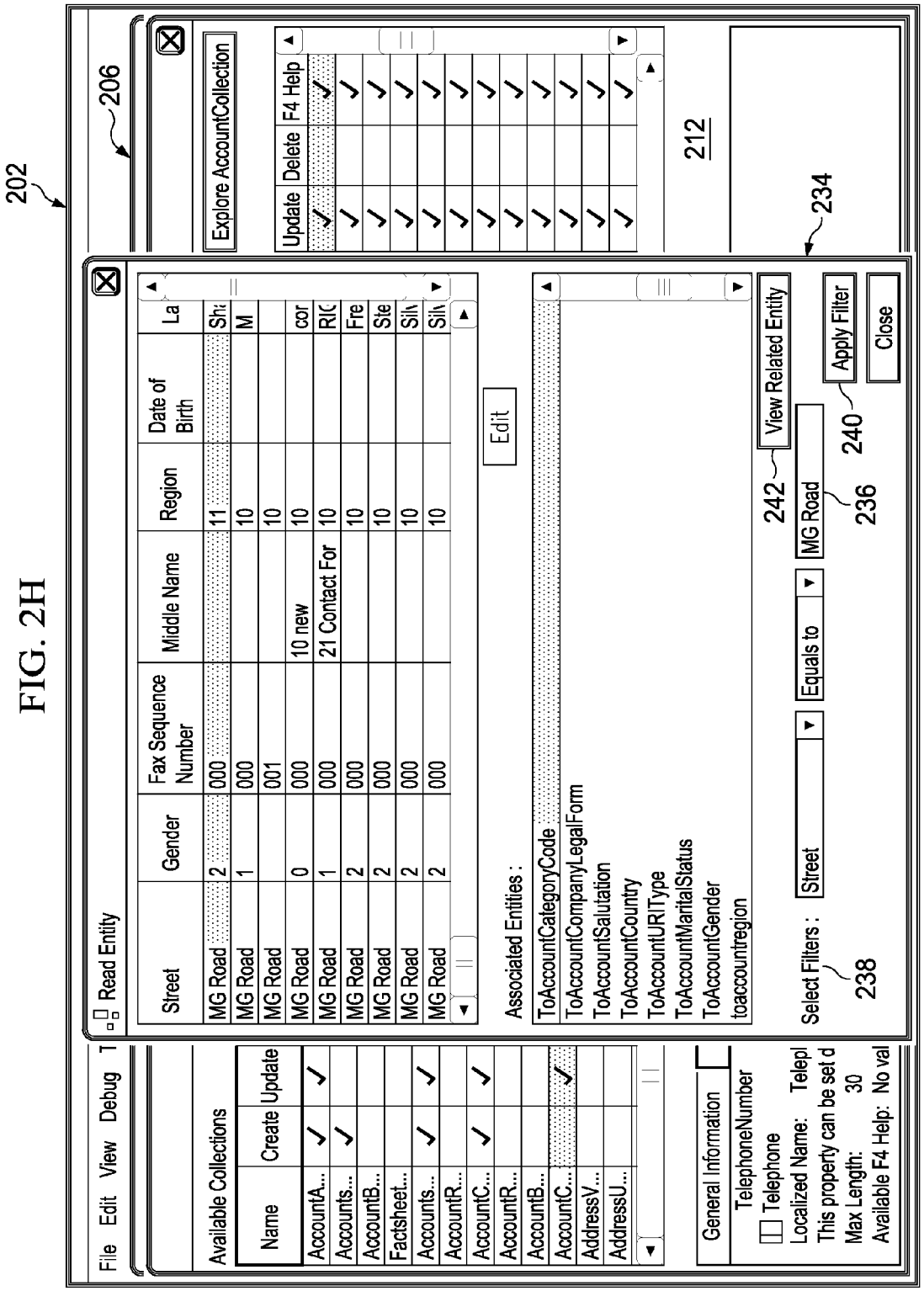

At 334, the first client computer system 102*a* can receive a filter to be applied to the sample data. For example, the first client computer system 102*a* can receive input to filter multiple properties associated with a resource by a specified filter. To do so, the developer can select filters displayed in the user interface portion 238. As shown in FIG. 2H, from a drop down list, the user can select filters, provide filter parameters (e.g., in the textbox 236), and apply the filter, e.g., by selecting the selectable object 240. At 336, the first client computer system 102*a* can determine that the specified filter can be applied. To do so, for example, the first client computer system 102*a* can determine whether the specified filter is included in the multiple filters by which the multiple properties can be filtered. Upon determining that the specified filter is included in the multiple filters, at 338, the first client computer system 102*a* can apply the filter. For example, the first client computer system 102*a* can filter the multiple properties by the specified filter.

Figure 2I:
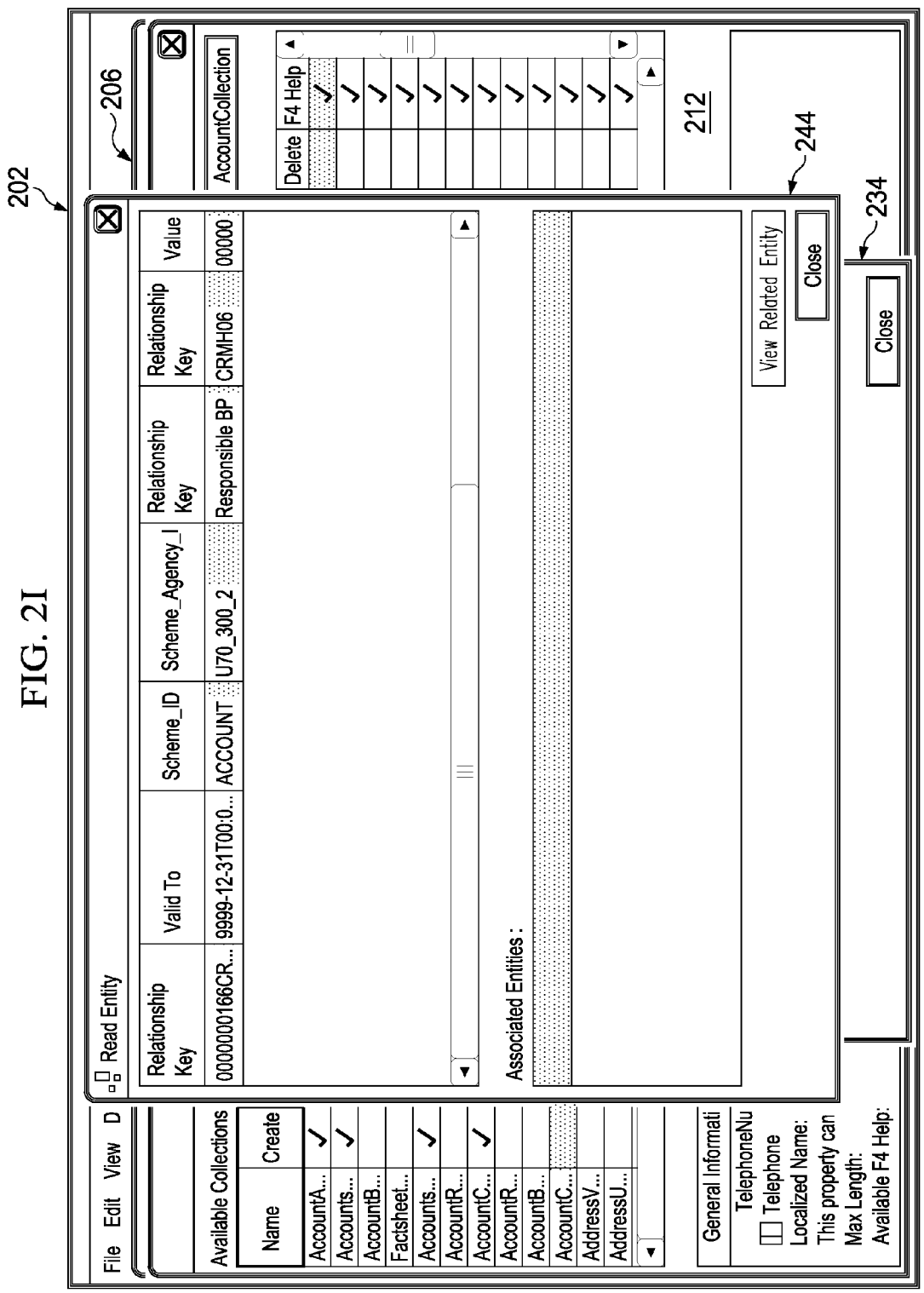

In some implementations, the first client computer system 102*a* can display associated entities in the user interface 234. The developer can select and view one of the entities, e.g., by selecting the selectable object 242 (FIG. 2H). In response to the selection of the selectable object 242, the first client computer system 102*a* can display the related entity in user interface 244 (FIG. 2I). For example, in the user interface 244, the first client computer system 102*a* can display information such as relationship key, validity, scheme ID, and other information.

Figure 2J:
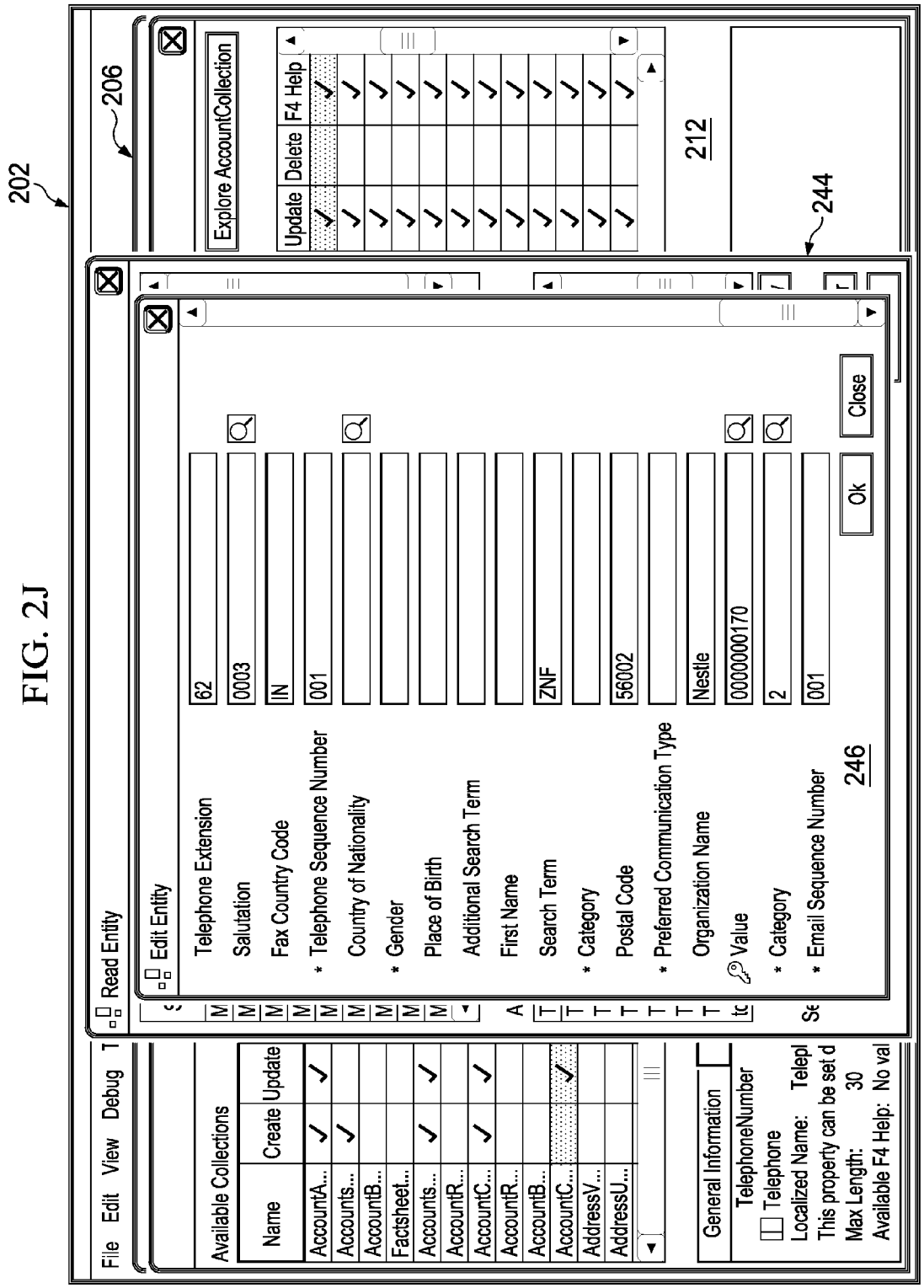

As described above, the resources are associated with respective boundaries which, among other things, represent mandatory parameters that must be provided when performing the resource operations on the respective resources. As shown in FIG. 3F, at 346, the first client computer system 102*a* can display the mandatory parameters. For example, in the user interface 246 (FIG. 2J), the first client computer system 102*a* displays multiple parameters (e.g., "Telephone Extension," "Salutation," "Fax Country Code," and other parameters). In the user interface 246, the first client computer system 102*a* displays a notification (e.g., an asterisk, a check mark, or other notification) adjacent to certain parameters (e.g., "Telephone Sequence Number," "Category," "Preferred Communication Type," and other certain parameters) indicating that the notified parameters are mandatory. At 348, the first client computer system 102*a* can receive an input including a parameter. At 350, the first client computer system 102*a* can perform a resource operation in response to determining that the parameter included in the input is one of the mandatory parameters. For example, if the input includes input to update a parameter that cannot be updated, then the first client computer system 102*a* may not perform the resource operation and, instead, can display a notification that the developer is not permitted to perform the requested resource operation.

Figure 2K:
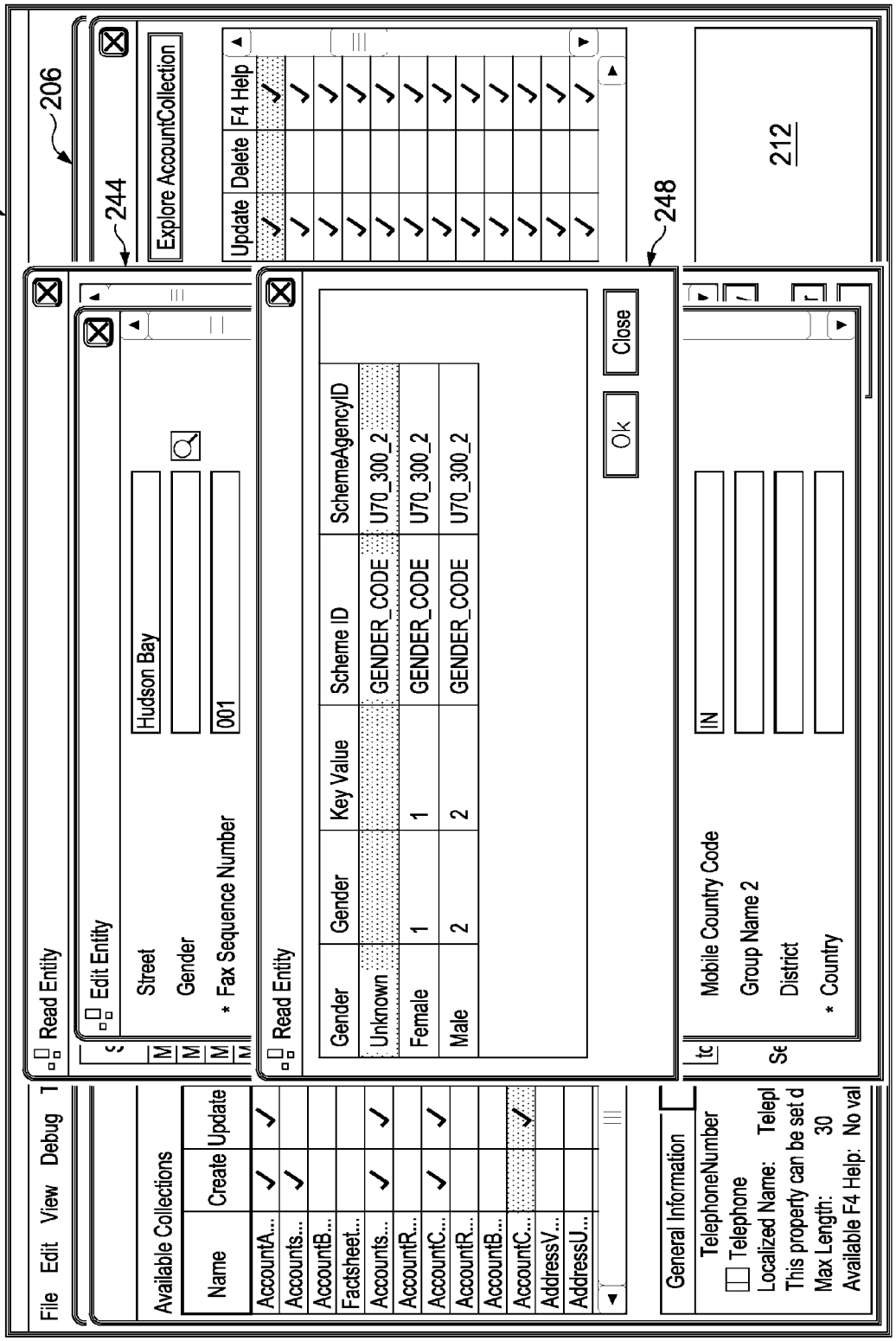
Figure 2L:
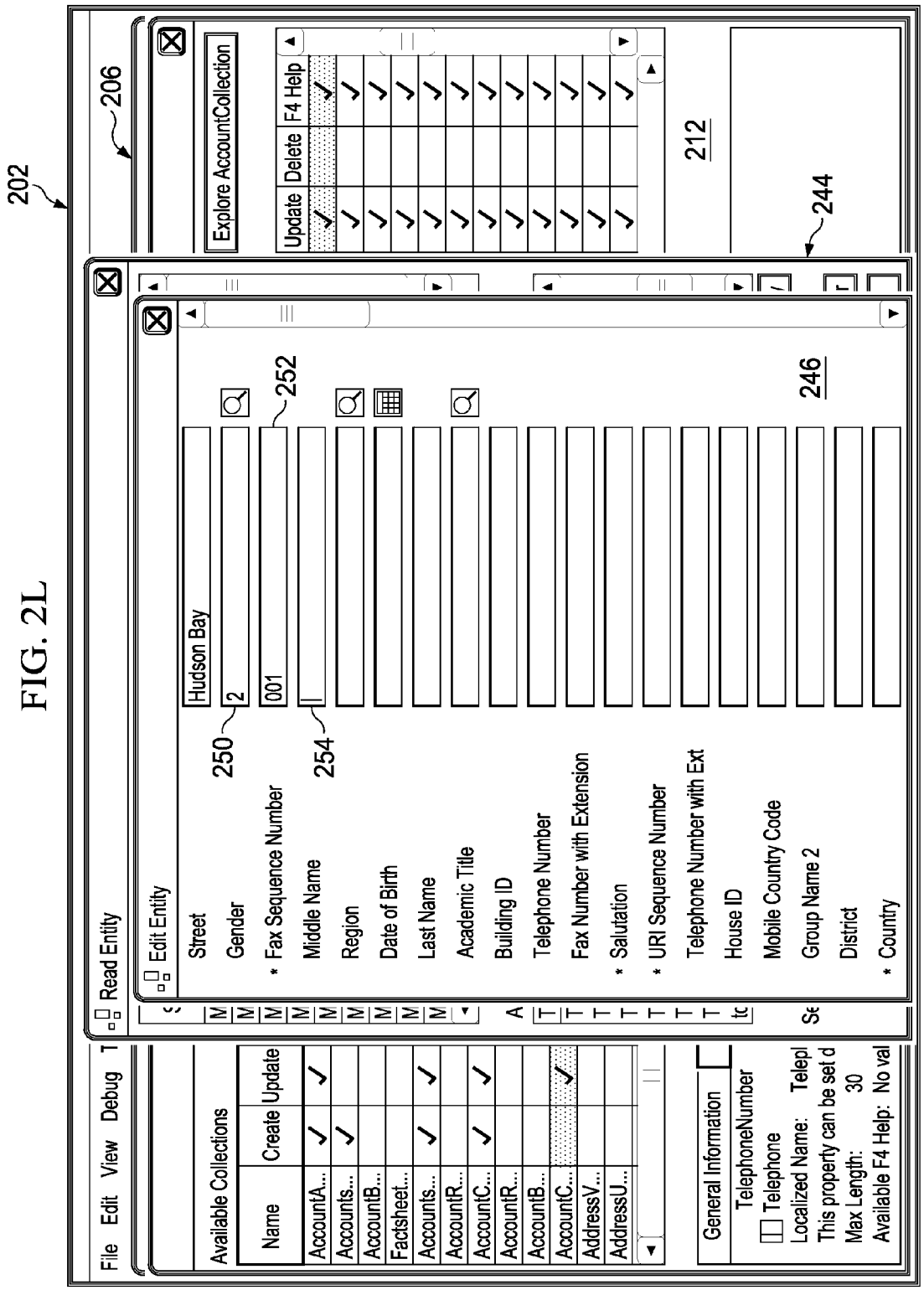
Figure 2M:
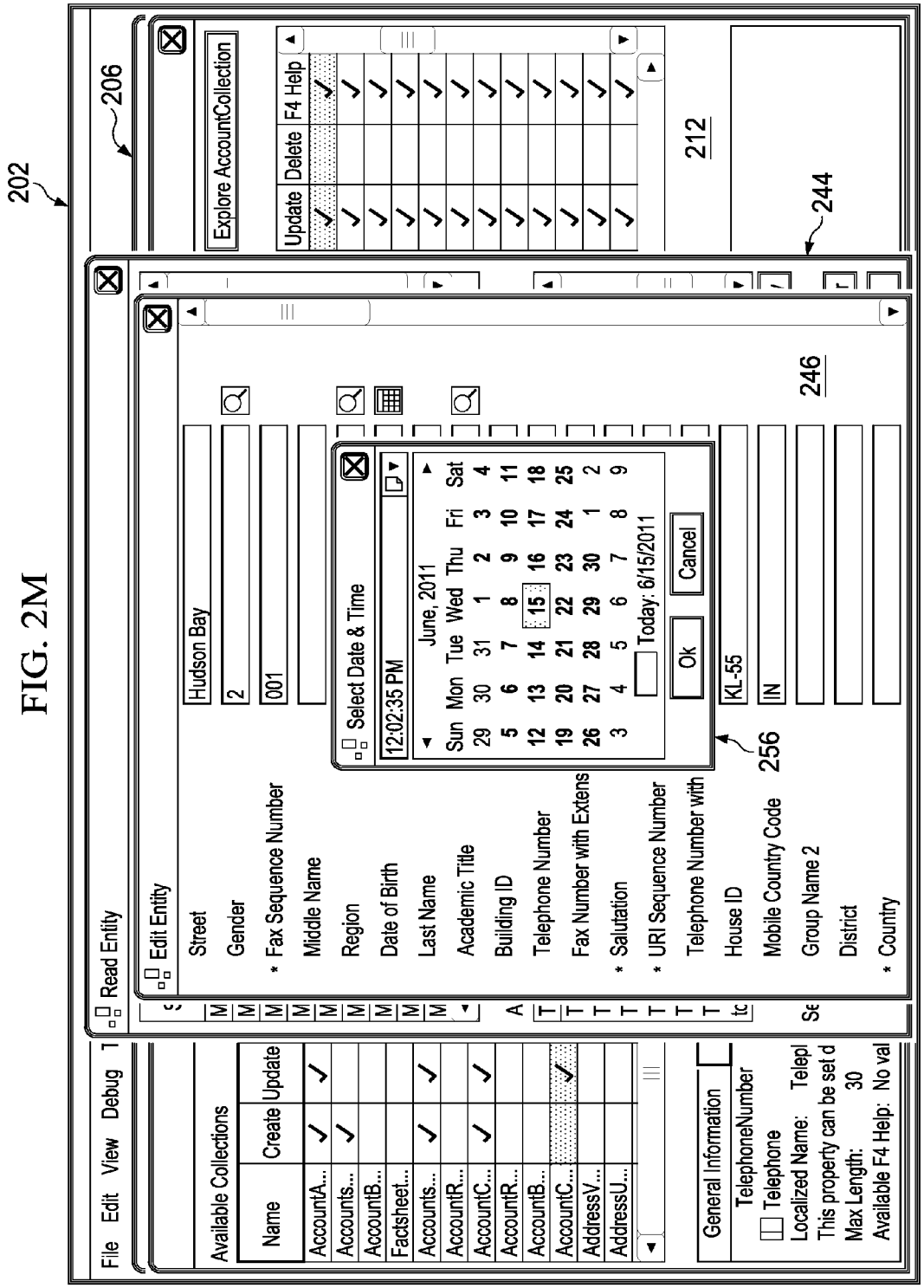
Figure 2N:
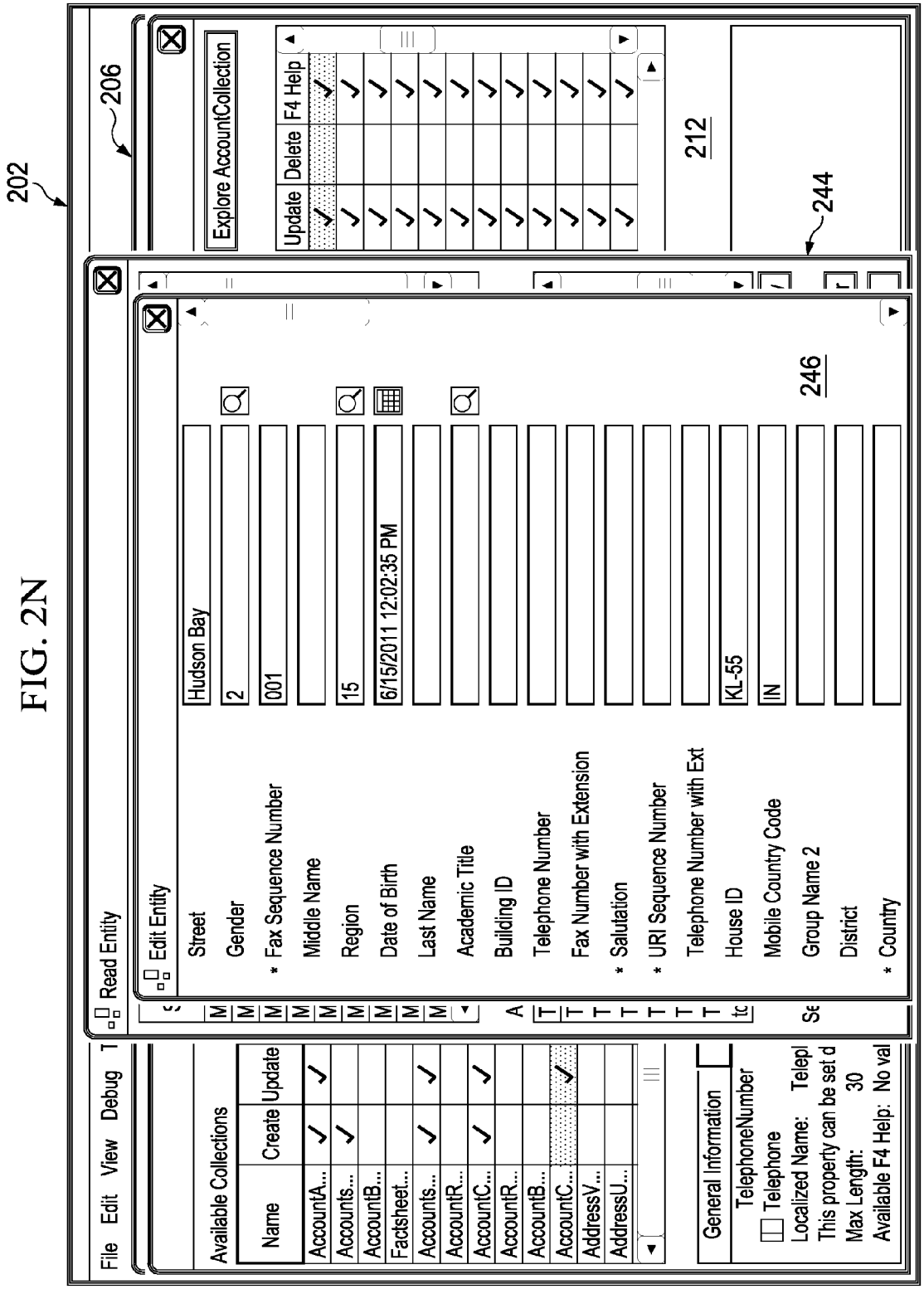

In some implementations, as shown in FIG. 2K, the first client computer system 102*a* can display, in user interface 248, possible entry fields based on the association of the resources. For example, if the entry fields contain fixed values that the computer system 102*a* can select from then the same can displayed in a value help picker as the possible values for the selected entry fields. This helps the developer in identifying the entry fields with possible value help options. A closer view of the user interface 246 (FIG. 2L) reveals different user interface representations for "Gender" 250, "Fax Sequence Number" 252, and "Middle Name" 254. The user interface representation for the entry fields displayed in the computer system 102*a* can be based on the entry field's semantics and attributes. For example the entry field for "Middle Name" 252 can be treated as simple editable text field; the entry field for the "Gender" 250 can be editable text field with options provided to the user for selecting the value from the possible value list as a value help picker. This helps the developer in designing a graphical interface on the computer system 102*a* based on the attributes of the entry fields. In some implementations, the first client computer system 102*a* can be configured to determine that the parameter to be provided is a date, and, in response, to display a calendar user interface 256 (FIG. 2M) from which the developer can select the date. The first client computer system 102*a* can enter the selected date in an appropriate text box (FIG. 2N). In this manner, the user interface tool executed by the first client computer system 102*a* can parse the XML document that includes the resources, metadata, semantics, filters, and other properties, that is received from the first server computer system 114*a* into a format that is visually and textually easier for a developer to view and interact.

In some implementations, the first client computer system 102*a* can handle semantic information defined as having "thing" attributes. For example, some of the resources exposed in the OData feed can be mapped as "thing" type, e.g., "Contact" or "Calendar" or "Task" or other "thing" type. The attributes of the contact resources can be described using certain standards, e.g., RFC standards for vCard. The first client computer system 102*a* can interpret attributes present in the OData feeds to inform the developer of the presence of these entities in a textual manner. Thus, the user interface tool executed by the first client computer system 102*a* can suggest a mapping between semantic information and other items.

Similar to the first client computer system 102*a*, one or more of the other client computer systems can similarly execute respective user interface tools described above to present OData feeds received from one or more of the other server computer systems. In this manner, multiple client computer systems can, in parallel, interact with OData feeds received from multiple server computer systems through the OData protocol.

Implementations of the subject matter and the operations described in this disclosure can be implemented in digital electronic circuitry, or in computer software, firmware, or hardware, including the structures disclosed in this disclosure and their structural equivalents, or in combinations of one or more of them. Implementations of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical and/or non-transitory components or media (for example, multiple CDs, disks, or other storage devices).

In some implementations, the operations described in this disclosure can be implemented as a hosted service provided on a server in a cloud computing network. For example, the computer-readable storage media can be logically grouped and accessible within a cloud computing network. Servers within the cloud computing network can include a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. The system can use cloud-based services to quickly receive software upgrades, applications, and other resources that would otherwise require a lengthy period of time before the resources can be delivered to the system.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this disclosure can be implemented on a computer having a display device, for example, a CRT (cathode ray tube) or LCD (liquid crystal display) monitor, for displaying information to the user, and a keyboard, a pointing device, for example, a mouse or a trackball, or a microphone and speaker (or combinations of them) by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components.

The components of the system can be interconnected by any form or medium of digital data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (for example, an HTML page) to a client device (for example, for purposes of displaying data to and receiving user input from a user interacting with the client device). Data generated at the client device (for example, a result of the user interaction) can be received from the client device at the server.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method performed by data processing apparatus, the method comprising:
receiving, at a client computer system, a plurality of resources defined according to a first data structure, the plurality of resources received from a server computer system connected to the client computer system through a data network in response to an Open Data Protocol (OData) request for the plurality of resources, and wherein each resource of the plurality of resources is associated with a boundary that specifies resource operations performable on the resource, the first data structure comprising a pre-defined eXtensible Markup Language (XML) structure, the first data structure defining each resource and an associated set of respective metadata and semantics specific to a particular resource, the respective metadata associated with at least one property corresponding to the particular resource;
identifying, from the plurality of resources and for each resource, the boundary associated with each particular resource and defining the resource operations that are performable on that particular resource;
translating, by the client computer system automatically in response to the identifying, the first data structure to a second data structure different from the first data structure, where, in the second data structure, each of the plurality of resources are editable to perform the resource operations on the corresponding resource, the second data structure comprising a tabular structure; and
displaying, in a user interface associated with the client computer system, a subset of the plurality of resources according to the second data structure, and the resource operations that are performable on each particular resource, wherein the second data structure displays each resource of the subset of the plurality of resources in a table including multiple rows and at least one column, each row representing a respective resource of the subset of the plurality of resources from the first data structure and including in at least one column information from the first data structure indicating the resource operations available for the respective resource, wherein, in response to receiving a selection of a particular resource, the client computer system identifies the at least one property corresponding to the particular resource, translates information defining the at least one property into a visual format, and presents the translated information defining the at least one property in the user interface.

2. The method of claim 1, wherein each of the plurality of resources is a network-accessible data object or service identified by a respective identifier, and wherein each of the plurality of resources is associated with respective metadata which is received with the plurality of resources.

3. The method of claim 1, wherein the plurality of resources are associated with a plurality of properties, and wherein the plurality of properties are filterable by a plurality of filters, and wherein the method further comprises:
identifying the plurality of filters by which the plurality of properties are filterable; and
displaying, in the user interface, the plurality of filters.

4. The method of claim 3, further comprising:
receiving input to filter the plurality of properties by a specified filter;
determining whether the specified filter is included in the plurality of filters; and
filtering the plurality of properties by the specified filter in response to determining that the specified filter is included in the plurality of filters.

5. The method of claim 1, wherein the boundary represents mandatory parameters that must be provided when performing the resource operations on each of the plurality of resources, and wherein the method further comprises:
displaying, in the user interface, the mandatory parameters;

receiving input to perform resource operations on a particular resource, the input including a parameter; and performing the resource operations based on the parameter in response to determining that the parameter included in the input is one of the mandatory parameters that must be provided when performing the resource operations on the particular resource.

6. The method of claim 5, further comprising displaying, in the user interface, a notification that the parameter is not one of the mandatory parameters, in response to determining that the parameter included in the input is not one of the mandatory parameters that must be provided when performing the resource operations on the particular resource.

7. The method of claim 1, wherein a particular resource is selected, and where the particular resource is a first resource, and wherein the method further comprises:

identifying an association defining a relationship between the first resource and a second resource in response to the Open Data Protocol (OData) request for the plurality of resources, wherein the relationship defines a referential constraint that relates the first resource to the second resource; and displaying, in the user interface, the relationship defined by the identified association.

8. The method of claim 1, wherein receiving the plurality of resources defined according to the first data structure comprises:

displaying, in the user interface, a plurality of services, each service being associated with a respective plurality of resources, the plurality of services including a specified resource associated with the received plurality of resources; and receiving, in the user interface, a selection of the specified resource.

9. The method of claim 8, wherein displaying the plurality of services in the user interface comprises:

receiving, in the user interface, authentication information that authenticates a requestor of the plurality of resources and an identifier identifying a computer-readable medium storing the plurality of resources; and determining that the requestor is authorized to access resources stored on the computer-readable medium based on the authentication information.

10. The method of claim 1, wherein a particular property of the at least one property is annotated with semantic information, the method further comprising:

analyzing, by the client computer system in response to receiving the selection of the particular resource, the semantic information associated with the particular property associated with the particular resource; and displaying, by the client computer system and in the user interface, a readable presentation of a representation of the semantic information.

11. A non-transitory computer-readable medium storing instructions executable by data processing apparatus to perform operations comprising:

receiving, at a client computer system, a plurality of resources defined according to a first data structure, wherein each of the plurality of resources is a network-accessible data object or service identified by a respective identifier, and wherein each of the plurality of resources is associated with respective metadata which is received with the plurality of resources, the plurality of resources received from a server computer system connected to the client computer system through a data network in response to an Open Data Protocol (OData) request for the plurality of resources, and wherein each resource of the plurality of resources is associated with a boundary that specifies resource operations performable on the resource, the first data structure comprising a pre-defined eXtensible Markup Language (XML) structure, the first data structure defining each resource and an associated set of respective metadata and semantics specific to a particular resource, the respective metadata associated with at least one property corresponding to the particular resource;

identifying, from the plurality of resources, and for each resource, the boundary associated with each particular resource and defining the resource operations that are performable on that particular resource;

translating, by the client computer system automatically in response to the identifying, the first data structure to a second data structure different from the first data structure, where, in the second data structure, each of the plurality of resources are editable to perform the resource operations on the corresponding resource, the second data structure comprising a tabular structure; and displaying, in a user interface associated with the client computer system, a subset of the plurality of resources according to the second data structure, and the resource operations that are performable on each particular resource, wherein the second data structure displays each resource of the subset of the plurality of resources in a table including multiple rows and at least one column, each row representing a respective resource of the subset of the plurality of resources from the first data structure and including in at least one column information from the first data structure indicating the resource operations available for the respective resource, wherein, in response to receiving a selection of a particular resource, the client computer system identifies the at least one property corresponding to the particular resource, translates information defining the at least one property into a visual format, and presents the translated information defining the at least one property in the user interface.

12. The medium of claim 11, wherein the boundary represents mandatory parameters that must be provided when performing the resource operations on each of the plurality of resources, and wherein the operations further comprise displaying, in the user interface, the mandatory parameters.

13. The medium of claim 11, wherein the plurality of resources are associated with a plurality of properties, and wherein the plurality of properties are filterable by a plurality of filters, and wherein the operations further comprise:

identifying the plurality of filters by which the plurality of properties are filterable; and displaying, in the user interface, the plurality of filters.

14. The medium of claim 13, the operations further comprising:

receiving input to filter the plurality of properties by a specified filter;

determining whether the specified filter is included in the plurality of filters; and filtering the plurality of properties by the specified filter in response to determining that the specified filter is included in the plurality of filters.

15. A system comprising:

data processing apparatus; and a computer-readable medium storing instructions executable by the data processing apparatus to perform operations comprising:

receiving, at a client computer system, a plurality of resources defined according to a first data structure, wherein each of the plurality of resources is a network-accessible data object or service identified by a respective identifier, and wherein each of the plurality of resources is associated with respective metadata which is received with the plurality of resources, the plurality of resources received from a server computer system connected to the client computer system through a data network in response to an Open Data Protocol (OData) request for the plurality of resources, and wherein each resource of the plurality of resources is associated with a boundary that specifies resource operations performable on the resource, the first data structure comprising a pre-defined eXtensible Markup Language (XML) structure, the first data structure defining each resource and an associated set of respective metadata and semantics specific to a particular resource, the respective metadata associated with at least one property corresponding to the particular resource;

identifying, from the plurality of resources and for each resource, the boundary associated with each particular resource and defining the resource operations that are performable on that particular resource;

translating, by the client computer system automatically in response to the identifying, the first data structure to a second data structure different from the first data structure, where, in the second data structure, each of the plurality of resources are editable to perform the resource operations on the corresponding resource, the second data structure comprising a tabular structure; and displaying, in a user interface associated with the client computer system, a subset of the plurality of resources according to the second data structure, and the resource operations that are performable on each particular resource, wherein the second data structure displays each resource of the subset of the plurality of resources in a table including multiple rows and at least one column, each row representing a respective resource of the subset of the plurality of resources from the first data structure and including in at least one column information from the first data structure indicating the resource operations available for the respective resource, wherein, in response to receiving a selection of a particular resource, the client computer system identifies the at least one property corresponding to the particular resource, translates information defining the at least one property into a visual format, and presents the translated information defining the at least one property in the user interface.

16. The system of claim 15, wherein the boundary represents mandatory parameters that must be provided when performing the resource operations each of the plurality of resources, and wherein the operations further comprise:

displaying, in the user interface, the mandatory parameters;

receiving input to perform resource operations on a particular, the input including a parameter; and performing the resource operations based on the parameter in response to determining that the parameter included in the input is one of the mandatory parameters that must be provided when performing the resource operations on the particular resource.

17. The system of claim 16, the operations further comprising displaying, in the user interface, a notification that the parameter is not one of the mandatory parameters, in response to determining that the parameter included in the input is not one of the mandatory parameters that must be provided when performing the resource operations on the particular resource.

18. The system of claim 15, wherein a particular resource is selected, and where the particular resource is a first resource, and wherein the operations further comprise:

identifying an association defining a relationship between the first resource and a second resource in response to the Open Data Protocol (OData) request for the plurality of resources, wherein the relationship defines a referential constraint that relates the first resource to the second resource; and displaying, in the user interface, the relationship defined by the identified association.

19. The system of claim 15, wherein receiving the plurality of resources defined according to the first data structure comprises:

receiving, in the user interface, authentication information that authenticates a requestor of the plurality of resources and an identifier identifying a computer-readable medium storing the plurality of resources;

determining that the requestor is authorized to access resources stored on the computer-readable medium based on the authentication information;

displaying, in the user interface, a plurality of services, each service being associated with a respective plurality of resources, the plurality of services including a specified resource associated with the received plurality of resources; and receiving, in the user interface, a selection of the specified resource.

* * * * *